United States Patent [19]

Yokota et al.

[11] Patent Number: 5,646,921
[45] Date of Patent: Jul. 8, 1997

[54] METHOD AND APPARATUS FOR REPRODUCING INFORMATION RECORDED ON CLV DISC TYPE RECORD MEDIUM

[75] Inventors: Hiroshi Yokota; Ryuichi Naito; Hiroyuki Hirano; Katsumi Ishii; Shinichi Naohara; Yoshifumi Tsukada, all of Tokorozawa; Kanya Matsumoto, Tokyo-to, all of Japan

[73] Assignee: Pioneer Electronic Corporation, Tokyo-to, Japan

[21] Appl. No.: 540,979

[22] Filed: Oct. 11, 1995

[30] Foreign Application Priority Data

Oct. 14, 1994 [JP] Japan .................................. 6-249874

[51] Int. Cl.$^6$ ........................................................ G11B 7/00
[52] U.S. Cl. .................................. 369/50; 369/54
[58] Field of Search .............................. 369/47–48, 50, 369/54, 58, 111, 124; 360/73.03

[56] References Cited

U.S. PATENT DOCUMENTS

5,412,629  5/1995  Shirane .................. 369/50 X

*Primary Examiner*—W. R. Young
*Attorney, Agent, or Firm*—Young & Thompson

[57] ABSTRACT

A record medium of disc type is recorded by a constant linear velocity. The record medium is reproduced by a reproducing apparatus, which reads the information from the rotated record medium into a buffer memory by a transmission rate corresponding to the number of rotation of the record medium and outputs the read information from the buffer memory to an external apparatus by a predetermined output rate. The method of reproducing the record medium by the reproducing apparatus is provided with the steps of: setting radial ranges of a plurality of virtual zones on the record medium, each of which is in a ring shape, and the number of rotation for each of the virtual zones, on the basis of upper and lower limit values of the transmission rate, which are predetermined to be higher than the predetermined output rate, a radius of the most inner circumference of an area where the information is recorded on the record medium, and a memory capacity of the buffer memory; rotating the record medium by a constant angular velocity in each of the set virtual zones by the set number of rotation; and reading the information from the rotated record medium by the transmission rate corresponding to the set number of rotation in each of the set virtual zones.

26 Claims, 6 Drawing Sheets

METHOD AND APPARATUS FOR REPRODUCING INFORMATION RECORDED ON CLV DISC TYPE RECORD MEDIUM

BACKGROUND OF THE INVENTION

1. Field of the Invention

The present invention generally relates to a method of and apparatus for reproducing in formation recorded on a called CLV (Constant Linear Velocity) type record medium such as a CD (Compact Disk)—ROM (Read Only Memory) of CLV

2. Description of the Related Art

The CD for music is well known as an record medium which has a memory capacity of large volume. Thus, there has been developed a CD-ROM, which is a CD recorded with the computer readable data such as program and data base instead of music signals. The CD-ROM is advantageous it is suitable for the mass production so that the production cost is relatively low. Thus, the CD-ROM has been a very popular record medium f or the recent Since the CD-ROM is recorded with the data for computer or the compressed digital video signals etc. instead of the music signals, from the view point of keeping the high recording density, the CD-ROM is basically recorded as a CLV type record medium, i.e. recorded by the constant linear velocity, in the same manner as the CD f or music.

In case what the CD-ROM of CLV type is used as an external ROM for the computer, it is preferable to decrease the access time i.e. the time required for the optical pickup to move to a specific position where the desired data are recorded on the optical disc. However, in case of the CD-ROM of CLV type, in order to keep the linear velocity constant during the rotation of the optical disc, it is necessary to change the rotation angular velocity in accordance with the radial position on the optical disk. Namely, the rotation angular velocity for reading a position near the inner circumference on the optical disc should be much lower than that near the outer circumference on the optical disc. Here, since the change in the rotation angular velocity requires a certain period of time, the CD disc of CLV type has an essential disadvantage to decrease the access time when the CLV type reproducing operation is performed.

Therefore, there may be proposed to reproduce the CD disc of CLV type by the CAV (Constant Angular Velocity) type reproducing operation. However, since data on the CD disc of CLV type are recorded on the assumption that they will be reproduced under the condition that the linear velocity is constant (i.e. by the CLV reproducing operation), if the CD disc of CLV-type would be reproduced under the condition that the angular velocity is constant (i.e. by the CAV reproducing operation), the transmission rate of the data is greatly changed between the reproduction near the outer circumference of the disc and the reproduction near the inner circumference of the disc.

More concretely, assuming that the number of rotation of the disc is about 1000 r.p.m. (rotation per minute), the data transmission rate is about 350 kBytes/sec at the most inner circumference on the disc while it is about 875 kBytes/sec at the most outer circumference on the disc. Namely, the difference in the transmission rate therebetween is as much as about 2.5 times.

In this case, the signal process unit in the CD player, which processes the data read out from the CLV type disc, should have the process capability of processing the data transmitted by the highest transmission rate (i.e. about 875 kBytes/sec).

However, when the data are read out from the portions other than the most outer circumference on the disc, since the data are only read out by the transmission rate lower than the data process rate of the process unit, an effective signal process cannot be performed by the signal process unit, which is a serious problem in a practical sense.

SUMMARY OF THE INVENTION

It is therefore an object of the present invention to provide a method of and apparatus for reproducing information recorded on a CLV type record medium, which can improve the transmission rate (i.e. the rate to read out the information from the CLV type record medium).

The above object of the present invention can be achieved by a first method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate. The first method is provided with the steps of: setting radial ranges of a plurality of virtual zones on the record medium, each of which is in a ring shape and in each of which the information is to be read while rotating the record medium by a constant angular velocity, and the number of rotation for each of the virtual zones, on the basis of upper and lower limit values of the transmission rate, which are predetermined to be higher than the predetermined output rate, a radius of the most inner circumference of an area where the information is recorded on the record medium, and a memory capacity of the buffer memory; rotating the record medium by the constant angular velocity in each of the set virtual zones by the set number of rotation corresponding to each of the set virtual zones; and reading the information from the rotated record medium by the transmission rate corresponding to the set number of rotation in each of the set virtual zones.

In the reproducing operation of the first method of the present invention, the radial ranges of a plurality of virtual zones and the number of rotation for each of the virtual zones are set on the basis of the upper and lower limit values of the transmission rate, the radius of the most inner circumference, and the memory capacity of the buffer memory by the setting step. Then, the record medium is rotated by the constant angular velocity in each of the set virtual zones by the set number of rotation corresponding to each of the set virtual zones by the rotating step, while the information is read from the rotated record medium by the transmission rate corresponding to the set number of rotation in each of the set virtual zones by the rotating step. Accordingly, the CAV type reproducing operation can be performed with respect to the record medium of the CLV type, in each of the virtual zones. During this reproducing operation, the transmission rate can be always made higher than the predetermined output rate by making the efficient use of the reading and outputting capability of the reproducing apparatus and the memory capacity of the buffer memory in view of the predetermined output rate, which is prescribed by the capability of processing the information in the external apparatus. Consequently, the average transmission rate as for the whole information on the record medium can be efficiently improved and the processing capability of the reproducing apparatus can be efficiently used according to the first method. In this manner, since the CAV type reproduction is performed in each of the virtual zones, the access time can be made short according to the first method of the present invention.

In one aspect of the first method, the first method is further provided with the steps of: detecting an information reading position on the record medium where the information is read; and identifying one of the set virtual zones which includes the detected information reading position. In the rotating and reading steps, the information in the identified virtual zone is read while the record medium is rotated by the set number of rotation corresponding to the identified virtual zone. Thus, the information can be certainly read by the set number of rotation in the corresponding virtual zone no matter where the information reading position is. This feature is especially advantageous when the information reading position (e.g. the position of the optical pickup) is suddenly moved by a large distance. In this case, it is preferred that the method is further provided with the steps of: judging whether or not there remains any information of a virtual zone other than the identified virtual zone in the buffer memory; and outputting the remaining information in the buffer memory to the external apparatus before reading the information of the identified virtual zone into the buffer memory. Thus, it is possible to prevent such a situation that the transmission rate as well as the number of rotation is changed in the middle of buffering the information of one virtual zone during the CAV type reproduction for one virtual zone.

In another aspect of the first method, the first method is further provided with the step of detecting the memory capacity of the buffer memory before the setting step, wherein, in the setting step, the radial ranges and the number of rotation are set on the basis of the upper and lower limit values, the radius and the memory capacity detected by the detecting step. Thus, even if the memory capacity of the buffer memory is not known in advance, still the radial ranges and the number of rotation can be set without any problem by use of the memory capacity detected by the detecting step.

In another aspect of the first method, the first method is further provided with the step of detecting a total information volume of the information recorded on the record medium before the setting step, wherein, in the setting step, the radial ranges and the number of rotation as well as a total number of the virtual zones are set on the basis of the upper and lower limit values, the radius, the memory capacity and the total information volume detected by the detecting step. Thus, the total number of the virtual zones, which is set by use of the total volume of the information detected by the detecting step, can be used to perform the reproducing operation more efficiently.

In another aspect of the first method, the setting step may be provided with the steps of: setting the number of rotation for one virtual zone which includes the most inner circumference on the basis of the radius and the lower limit value of the transmission rate; calculating a changing rate of the transmission rate in one virtual zone on the basis of the set number of rotation; setting the radial range of one virtual zone on the basis of the calculated changing rate and the upper limit value of the transmission rate; determining an information volume of one virtual zone on the basis of the set radial range of one virtual zone; and repeating the number of rotation setting step, the changing rate calculating step, the radial range determining step and the information volume determining step for another virtual zone which is adjacent to one virtual zone at an outer circumference side of one virtual zone, one after another. Thus, the radial ranges of the virtual zones and the number of rotation for each virtual zones can be efficiently set one after another from the inner circumference side toward the outer circumference side on the record medium.

In another aspect of the first method, the lower limit value of the transmission rate may be set to be equal to a maximum process rate for processing the outputted information of the external apparatus. Thus, it is possible to make the best use of the processing capability of the external apparatus. Alternatively, the lower limit value of the transmission rate may be set to be equal to the predetermined output rate, which corresponds to the processing capability of the external apparatus.

In another aspect of the first method, the upper limit value of the transmission rate may be set to be not higher than a maximum reading rate for reading the information into the buffer memory. Thus, it is possible to prevent such a situation that the buffer memory cannot keep up with the information by the transmission rate in the reproducing apparatus during the reproducing operation.

The above object of the present invention can be also achieved by a second method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate. Radial ranges of a plurality of virtual zones on the record medium, each of which is in a ring shape and in each of which the information is to be read while rotating the record medium by a constant angular velocity, and the number of rotation for each of the virtual zones, are set on the basis of upper and lower limit values of the transmission rate, which are predetermined to be higher than the predetermined output rate, a radius of the most inner circumference of an area where the information is recorded on the record medium, and a memory capacity of the buffer memory. The set radial ranges and the set number of rotation are stored in a memory device of the reproducing apparatus in advance of reproducing the information. The second method is provided with the steps of: reading out the set radial ranges and the set number of rotation from the memory device; rotating the record medium by the constant angular velocity in each of the virtual zones by the read out number of rotation corresponding to each of the virtual zones; and reading the information from the rotated record medium by the transmission rate corresponding to the read out number of rotation in each of the virtual zones.

According to the second method, in advance of reproducing the information, the radial ranges of the virtual zones and the number of rotation for each of the virtual zones are set on the basis of the upper and lower limit values of the transmission rate, the radius of the most inner circumference and the memory capacity of the buffer memory. Then, the set radial ranges and the set number of rotation are stored in the memory device. In the reproducing operation of the second method, the set radial ranges and the set number of rotation are read out from the memory device. Then, the reproducing operation is performed in the same manner as in the aforementioned first method of the present invention by using the read out radial ranges and the read out number of rotation in the setting step. Accordingly, in addition to the advantageous feature of the first method, since the radial ranges of the virtual zones and the number of rotation for each virtual zone are stored in the memory device, the operation in the setting step as well as the whole construction of the reproducing apparatus can be made simplified according to the second method.

In one aspect of the second method, the second method is further provided with the steps of: detecting an information reading position on the record medium where the information is read; and identifying one of the virtual zones which includes the detected information reading position. In the rotating and reading steps, the information in the identified virtual zone is read while the record medium is rotated by the read out number of rotation corresponding to the identified virtual zone. Thus, the information can be certainly read by the set number of rotation in the corresponding virtual zone no matter where the information reading position is.

In another aspect of the second method, the second method is further provided with the steps of: detecting a total information volume of the information recorded on the record medium; and setting a total number of the virtual zones on the basis of the upper and lower limit values, the radius, the memory capacity, and the total information volume detected by the detecting step. Thus, the total number of the virtual zones, which is set by use of the total volume of the information detected by the detecting step, can be used to perform the reproducing operation more efficiently. In this case, it is preferable that, in the detecting step, a TOC (Table Of Contents) information, which includes information indicating the total information volume, is read from the record medium to detect the total information volume. Thus, the total information volume can be easily detected just by detecting the TOC information.

The above object of the present invention can be also achieved by a third method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate. The third method is provided with the steps of: setting the number of rotation of the record medium, on the basis of a lower limit value of the transmission rate, which is predetermined to be higher than the predetermined output rate, and a reproduction starting position on the record medium where the information is started to be reproduced; rotating the record medium by a constant angular velocity by the set number of rotation; reading the information from the rotated record medium by the transmission rate corresponding to the set number of rotation; monitoring the transmission rate and the information volume accumulated in the buffer memory; judging whether or not the monitored transmission rate exceeds a predetermined upper limit value of the transmission rate; judging whether or not the monitored information volume exceeds a predetermined volume prescribed by a memory capacity of the buffer memory; detecting an information reading position on the record medium where the information is read when at least one of the monitored transmission rate and the monitored information volume is judged to exceed in the judging steps; and outputting all information accumulated in the buffer memory to the external apparatus and updating the set number of rotation by performing the setting step again by use of the detected information reading position as the reproduction starting position of the setting step, after the step of detecting the information reading position. The record medium is rotated by the updated number of rotation from the detected information reading position.

In the reproducing operation of the third method, the number of rotation of the record medium is set on the basis of the lower limit value of the transmission rate and the reproduction starting position. Then, the record medium is rotated by a constant angular velocity by the set number of rotation while the information is read from the rotated record medium by the transmission rate corresponding to the set number of rotation. During the reproducing operation, the transmission rate and the information volume accumulated in the buffer memory are monitored. Here, on one hand, it is judged whether or not the monitored transmission rate exceeds the predetermined upper limit value of the transmission rate. On the other hand, it is judged whether or not the monitored information volume exceeds the predetermined volume prescribed by the memory capacity of the buffer memory. Then, when at least one of the monitored transmission rate and the monitored information volume is judged to exceed in the judging steps, the information reading position is detected by the detecting step. Then, all information accumulated in the buffer memory is outputted to the external apparatus, and the set number of rotation is updated by performing the setting step again by use of the detected information reading position as the reproduction starting position. Then, the record medium is rotated by the updated number of rotation from the detected information reading position. Accordingly, the CAV type reproducing operation can be performed with respect to the record medium of the CLV type, in each of the virtual zones. During this reproducing operation, the transmission rate can be always made higher than the predetermined output rate by making the efficient use of the reading and outputting capability of the reproducing apparatus and the memory capacity of the buffer memory in view of the predetermined output rate, which is prescribed by the capability of processing the information in the external apparatus. Consequently, the average transmission rate as for the whole information on the record medium can be efficiently improved and the processing capability of the reproducing apparatus can be efficiently used according to the third method of the present invention.

In one aspect of the third method, the third method is further provided with the step of detecting the memory capacity of the buffer memory. The predetermined volume is determined on the basis of the detected memory capacity. Thus, even if the predetermined volume is not known, it can be determined without any problem by use of the detected memory capacity.

The above object of the present invention can be also achieved by a first apparatus for reproducing information from a record medium of disc type, which is recorded by a constant linear velocity. The first apparatus is provided with: a rotation device for rotating the record medium; a read device including a buffer memory for reading the information from the rotated record medium into the buffer memory by a transmission rate corresponding to the number of rotation of the record medium; an output device for outputting the read information from the buffer memory to an external apparatus by a predetermined output rate; and a setting device for setting radial ranges of a plurality of virtual zones on the record medium, each of which is in a ring shape and in each of which the information is to be read while rotating the record medium by a constant angular velocity, and the number of rotation for each of the virtual zones, on the basis of upper and lower limit values of the transmission rate, which are predetermined to be higher than the predetermined output rate, a radius of the most inner circumference of an area where the information is recorded on the record medium, and a memory capacity of the buffer memory. The rotation device rotates the record medium by the constant angular velocity in each of the set virtual zones by the set number of rotation corresponding to each of the set virtual zones. The read device reads the information from the rotated record medium by the transmission rate corresponding to the set number of rotation in each of the set virtual zones.

Thus, just in the same manner as the first method of the present invention, the average transmission rate as for the whole information on the record medium can be efficiently improved and the processing capability of the reproducing apparatus can be efficiently used according to the first apparatus of the present invention.

In one aspect of the first apparatus, the first apparatus is further provided with: a position detection device for detecting an information reading position on the record medium where the information is read; and an identifying device for identifying one of the set virtual zones which includes the detected information reading position. The information in the identified virtual zone is read by the read device while the record medium is rotated by the rotation device by the set number of rotation corresponding to the identified virtual zone. Thus, the information can be certainly read by the set number of rotation in the corresponding virtual zone no matter where the information reading position is. In this case, the first apparatus is preferably further provided with a judgement device for judging whether or not there remains any information of a virtual zone other than the identified virtual zone in the buffer memory. The output device outputs the remaining information in the buffer memory to the external apparatus before the read device reads the information of the identified virtual zone into the buffer memory. Thus, it is possible to prevent such a situation that the transmission rate as well as the number of rotation is changed in the middle of buffering the information of one virtual zone during the CAV type reproduction for one virtual zone.

In another aspect of the first apparatus, the first apparatus is further provided with a capacity detection device for detecting the memory capacity of the buffer memory. The radial ranges and the number of rotation are set by the setting device on the basis of the upper and lower limit values, the radius and the memory capacity detected by the capacity detection device. Thus, even if the memory capacity of the buffer memory is not known in advance, still the radial ranges and the number of rotation can be set without any problem by use of the memory capacity detected by the capacity detection device.

In another aspect of the first apparatus, the setting device may be provided with: a first device for setting the number of rotation for one virtual zone which includes the most inner circumference on the basis of the radius and the lower limit value of the transmission rate; a second device for calculating a changing rate of the transmission rate in one virtual zone on the basis of the number of rotation set by the first device; a third device for setting the radial range of one virtual zone on the basis of the changing rate calculated by the second device and the upper limit value of the transmission rate; a fourth device for determining an information volume of one virtual zone on the basis of the radial range of one virtual zone set by the third device; and a fifth device for controlling the first, second, third and fourth devices to repeat each operation for another virtual zone which is adjacent to one virtual zone at an outer circumference side of one virtual zone, one after another. Thus, the radial ranges of the virtual zones and the number of rotation for each virtual zones can be efficiently set one after another from the inner circumference side toward the outer circumference side on the record medium.

In another aspect of the first apparatus, the read device may be provided with an information process unit for processing the information from the rotated record medium by a processing rate higher than the upper limit value of the transmission rate, and inputting the processed information into the buffer memory. Thus, in the read device, an information process such as an error correct process, a de-interleave process etc., can be performed without any problem by the information process unit.

The above object of the present invention can be also achieved by a second apparatus for reproducing information from a record medium of disc type, which is recorded by a constant linear velocity. The second apparatus is provided with: a rotation device for rotating the record medium; an information read device including a buffer memory for reading the information from the rotated record medium into a buffer memory by a transmission rate corresponding to the number of rotation of the record medium; an output device for outputting the read information from the buffer memory to an external apparatus by a predetermined output rate; a memory device for storing radial ranges of a plurality of virtual zones on the record medium, each of which is in a ring shape and in each of which the information is to be read while rotating the record medium by a constant angular velocity, and the number of rotation for each of the virtual zones, which are set on the basis of upper and lower limit values of the transmission rate, which are predetermined to be higher than the predetermined output rate, a radius of the most inner circumference of an area where the information is recorded on the record medium, and a memory capacity of the buffer memory; and a set value read device for reading out the set radial ranges and the set number of rotation from the memory device. The rotation device rotates the record medium by the constant angular velocity in each of the virtual zones by the read out number of rotation corresponding to each of the virtual zones. The information read device reads the information from the rotated record medium by the transmission rate corresponding to the read out number of rotation in each of the virtual zones.

Thus, just in the same manner as the second method of the present invention, in addition to the advantageous feature of the first apparatus, the operation in the setting device as well as the whole construction of the reproducing apparatus can be made simplified according to the second apparatus.

In one aspect of the second apparatus, the second apparatus is further provided with: a position detection device for detecting an information reading position on the record medium where the information is read; and an identify device for identifying one of the virtual zones which includes the detected information reading position. The information in the identified virtual zone is read by the information read device while the record medium is rotated by the rotation device by the read out number of rotation corresponding to the identified virtual zone. Thus, the information can be certainly read by the set number of rotation in the corresponding virtual zone no matter where the information reading position is.

The above object of the present invention can be also achieved by a third apparatus for reproducing information from a record medium of disc type, which is recorded by a constant linear velocity. The third apparatus is provided with: a rotation device for rotating the record medium; a read device including a buffer memory for reading the information from the rotated record medium into the buffer memory by a transmission rate corresponding to the number of rotation of the record medium; an output device for outputting the read information from the buffer memory to an external apparatus by a predetermined output rate; and a setting device for setting the number of rotation of the record medium, on the basis of a lower limit value of the transmission rate, which is predetermined to be higher than the predetermined output rate, and a reproduction starting position on the record medium where the information is started to be reproduced. The rotation device rotates the record medium by a constant angular velocity by the set number of rotation, while the read device reads the information from the rotated record medium by the transmission rate corresponding to the set number of rotation. The third apparatus is also provided with: a monitor device for monitoring the transmission rate and the information volume accumulated in the buffer memory; a first judgement device for judging whether or not the monitored transmission rate exceeds a predetermined upper limit value of the transmission rate; a second judgement device for judging whether or not the monitored information volume exceeds a predetermined volume prescribed by a memory capacity of the buffer memory; and a position detection device for detecting an information reading position on the record medium where the information is read when at least one of the monitored transmission rate and the monitored information volume is judged to exceed by the first and second judgement devices. The output device outputs all information accumulated in the buffer memory to the external apparatus. The third apparatus is further provided with: an update device for updating the set number of rotation by controlling the setting device to set the number of rotation again by use of the detected information reading position as the reproduction starting position in the setting device, after the information reading position is detected by the position detection device. The record medium is rotated by the updated number of rotation from the detected information reading position.

Accordingly, just in the same manner as the third method of the present invention, the average transmission rate as for the whole information on the record medium can be efficiently improved and the processing capability of the reproducing apparatus can be efficiently used according to the third apparatus of the present invention. Especially, by setting the lower limit value of the transmission rate to be equal to a maximum processing rate of processing the information in the external apparatus, it is possible to make the best use of the processing capability of the external apparatus.

In one aspect of the third apparatus, the third apparatus is further provided with a capacity detection device for detecting the memory capacity of the buffer memory. The predetermined volume is determined on the basis of the detected memory capacity. Thus, even if the memory capacity of the buffer memory is not known in advance, still, the predetermined volume can be determined without any problem by the detection result of the capacity detection device.

In another aspect of the third apparatus, the predetermined upper limit value of the transmission rate may be set to be not higher than a maximum reading rate for reading the information into the buffer memory in the read device. Thus, it is possible to prevent such a situation that the buffer memory cannot keep up with the information by the transmission rate during the reproducing operation.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(I) First Embodiment

Figure 1:
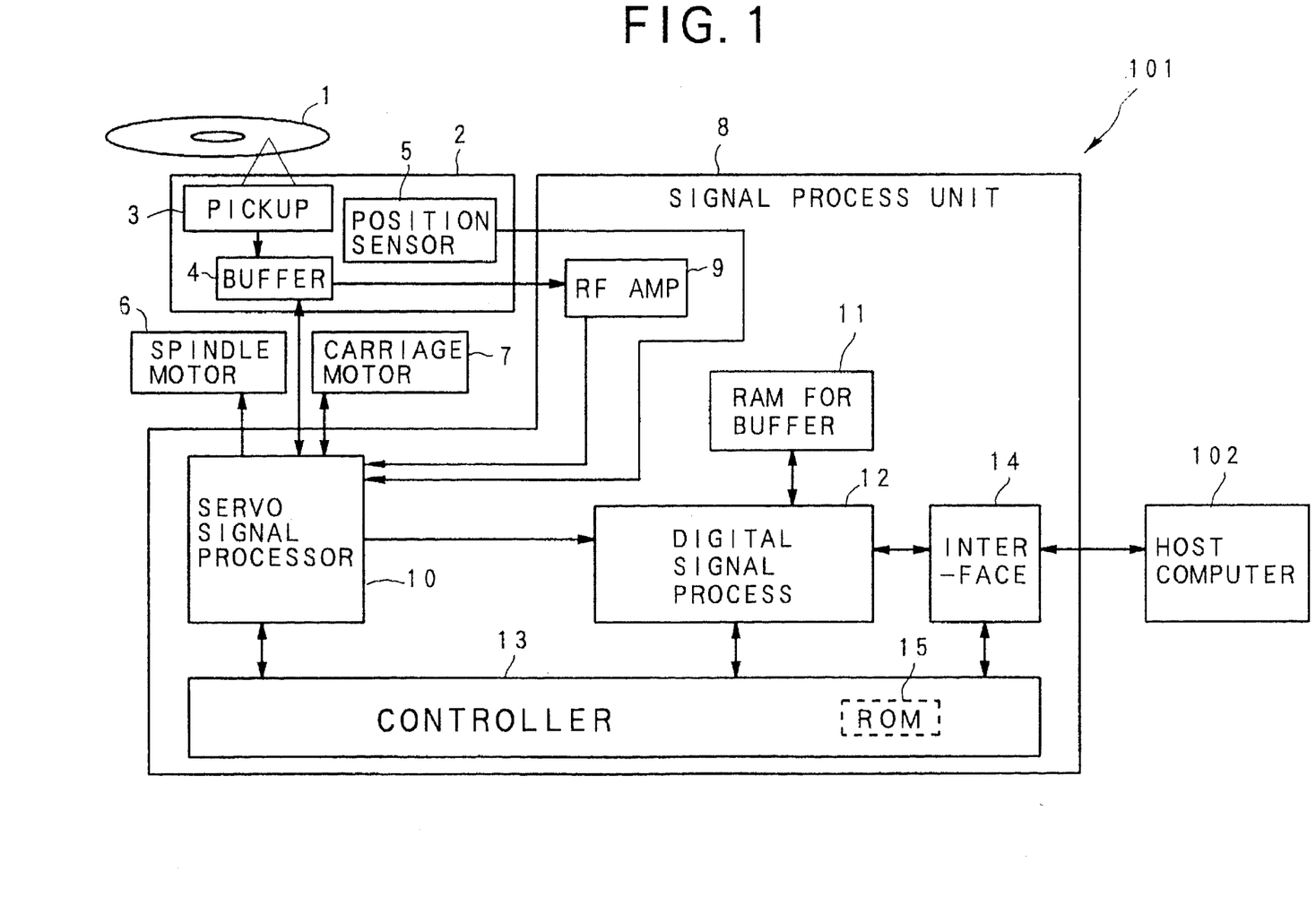
FIG. 1 is a block diagram of a CD-ROM player as a first embodiment of the present invention.

First of all, a construction of a CD-ROM player as a first embodiment of the present invention is explained with referring to FIG. 1.

In FIG. 1, a CD-ROM player 101 for reproducing a CLV disc 1, which is one example of the CD-ROM recorded with computer readable information, is provided with: an optical pickup unit 2 for reading light information form the CLV disc 1 and converting it into an electrical signal; a signal process unit 8 for processing the electrical signal from the optical pickup unit 2 and outputting it to a host computer 102 which is coupled to the signal process unit 8, and outputting servo signals to perform various servo controls of the optical pickup unit 2 so as to appropriately detect the information; a spindle motor 6 for rotating the CLV disc 1 on the basis of a number of rotation control signal, which is included in the servo signals from the signal process unit 8; and a carriage motor 7 for driving a carriage for moving the optical pickup unit 2 in the radial direction of the CLV disc 1.

The optical pickup unit 2 is provided with: an optical pickup 3 for irradiating the CLV disc 1 with a detection light, receiving the reflected light from the CLV disc 1 and converting it into the electrical signal to output the electrical signal; a buffer 4 for temporarily storing the output of the optical pickup 3 and outputting it at a predetermined timing; and an optical pickup position sensor 5 for detecting the position of the optical pickup 3 and outputting a position detection signal.

The signal process unit 8 is provided with an RF (Radio Frequency) amplifier 9, a servo signal processor 10, a RAM for buffering 11, a digital signal process portion 12, a controller 13 and an interface portion 14.

The RF amplifier 9 amplifies the RF output signal from the buffer 4 of the optical pickup unit 2. The servo signal processor 10 outputs the servo signals to perform the focusing and tracking controls of the optical pickup 3 and the carriage servo control of the carriage motor 7 and the spindle servo control of the spindle motor 6, on the basis of the RF signal from the RF amplifier 9 and the position detection signal from the optical pickup position sensor 5, under the control of the controller 13. The digital signal process portion 12 applies an error correction process, a deinterleave process, etc. to the RF signal inputted through the servo signal processor 10, and outputs it to the RAM for buffering 11 under the control of the controller 13. Further, the digital signal process portion 12 reads out the information stored or accumulated in the RAM for buffering 11 at the predetermined timing, and outputs it to the interface portion 14 under the control of the controller 13. The interface portion 14 performs the interface operation with respect to the information outputted from the digital signal process portion 12 under the control of the controller 13, and outputs it to the host computer 102. The controller 13 controls the whole portion of the CD-ROM player 101 on the basis of the predetermined program, which is stored in an internal ROM 15 equipped in the controller 13, and a control command sent from the host computer 102.

In the construction explained above, the information reproduced from the CLV disc 1 is temporarily stored in the RAM for buffering 11, and is read out through the interface portion 14 by an output rate prescribed by the processing capability of the host computer 102.

Nextly, the operation of the first embodiment will be explained with referring to FIGS. 1 to 4.

Figure 2:
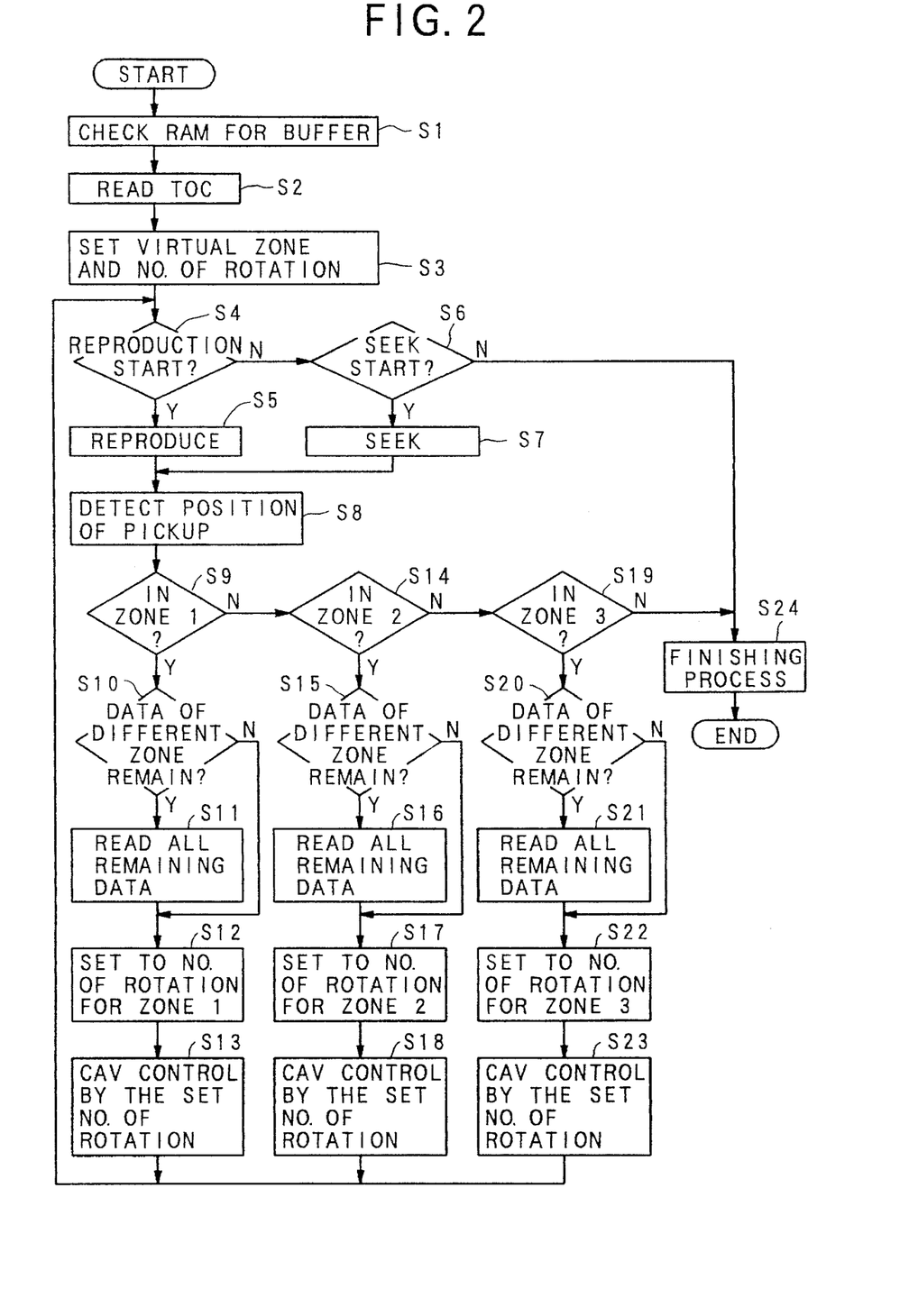
FIG. 2 is a flow chart showing an operation of the first embodiment.

FIG. 2 is a flow chart showing the operation of the first embodiment. The operation shown in FIG. 2 is performed under the control of the controller 13.

In FIG. 2, firstly, the memory capacity of the RAM for buffering 11 usable as a buffer is checked (step S1). Nextly, by reading the TOC (Table Of Contents) information of the CLV disc 1, the total volume of the information recorded on the CLV disc 1 is checked (step S2). Then, the radial ranges on the CLV disc 1 corresponding to a plurality of virtual zones which are in a ring shape having a center at the center of the CLV disc 1 and are virtually set on the CLV disc 1, the number of rotation of the CLV disc 1 in each of the virtual zones and the total number of the virtual zones are set on the basis of the total volume of the information recorded on the CLV disc 1 (which has been already checked by the step S2), the upper and lower limit values of the transmission rate at the time of reading the information into the RAM for buffering 11 (which are set in advance), the usable memory capacity of the RAM for buffering 11 (which has been already checked by the step S1) and the radius of the most inner circumference of the program area (where the information are recorded by phase pits etc.) on the CLV disc 1 (step S3). The more concrete operations in this step S3 will be explained later in detail. In the first embodiment, it is assumed that 3 zones i.e. a zone 1 to a zone 3 are set as the virtual zones.

Then, it is judged whether or not the reproduction is to be started (step S4). If it is to be started (step S4, YES), the reproducing operation is started (step S5).

In the reproducing operation, the CLV disc 1 is rotated by the number of rotation which has been set by the step 3 and is constant in each virtual zone, the information is read into the RAM for buffering 11 by the transmission rate corresponding to the number of rotation, and, at the same time the information is read out by the output rate set on the basis of the processing capacity of the host computer 102 (which corresponds to the lower limit value Rmin of the transmission rate). Then, the read out information is outputted through the interface portion 14 to the host computer 102.

At the step S4, if the reproduction is not to be started (step S4, NO), it is further judged whether or not the seek operation is to be started (step S6). If the seek operation is to be started (step S6, YES), the predetermined seek operation is performed (step S7). If the seek operation is not to be started (step S6, NO), the finishing process such as a fixing operation of the optical pickup 3 is performed (step S24).

Nextly, in case that the reproducing operation of the step S5 or the seek operation of the step S7 is started, the position of the optical pickup i.e. the information reading position is detected by the optical pickup position sensor 5 (step S8).

Then, it is judged whether or not the detected reading position is within the zone 1 (step S9). If it is within the zone 1 (step S9, YES), it is further judged whether or not there remain in the RAM for buffering 11 any data of the zones different from the zone 1 so as to judge whether or not the RAM for buffer 11 is usable at the present (step S10). If there remain no data of the different zones in the RAM for buffer 11 (step S10, NO), the flow branches to a step S12. If there remain data of the different zones in the RAM for buffering 11 (step S10, YES), the remaining data are all read out from the RAM for buffering 11 so as to make the RAM for buffering 11 usable (step S11). Then, the actual number of rotation of the spindle motor 6 is set to the number of rotation corresponding to the zone 1, which has been set by the step S3 (step S12), and the number of rotation is maintained to be constant so as to perform the CAV type reproduction in the zone 1 (step S13). In order to reproduce the information while rotating the CLV disc 1 by the constant number of rotation (by the CAV type reproduction), the flow returns to the step S4.

At the step S9, if the detected reading position is not within the zone 1 (step S9, NO), it is further judged whether or not the detected reading position is within the zone 2 (step S14). If it is within the zone 2 (step S14, YES), the processes same as those for the zone 1 from the steps S10 to S13 are performed (steps S15 to S18).

At the step S14, if the detected reading position is not within the zone 2 (step S14, NO), it is further judged whether or not the detected reading position is within the zone 3 (step S19). If it is within the zone 3 (step S19, YES), the processes same as those for the zone 1 from the steps S10 to S13 and the zone 2 from the steps S15 to S18 are performed (step S20 to S23). At the step S19, if it is not within the zone 3 (step S19, NO), it is concluded that there is no information to be reproduced (i.e. the detected reading position is positioned within the lead out area), so that the finishing process such as the fixing operation of the optical pickup 3 is performed (step S24).

Figure 3:
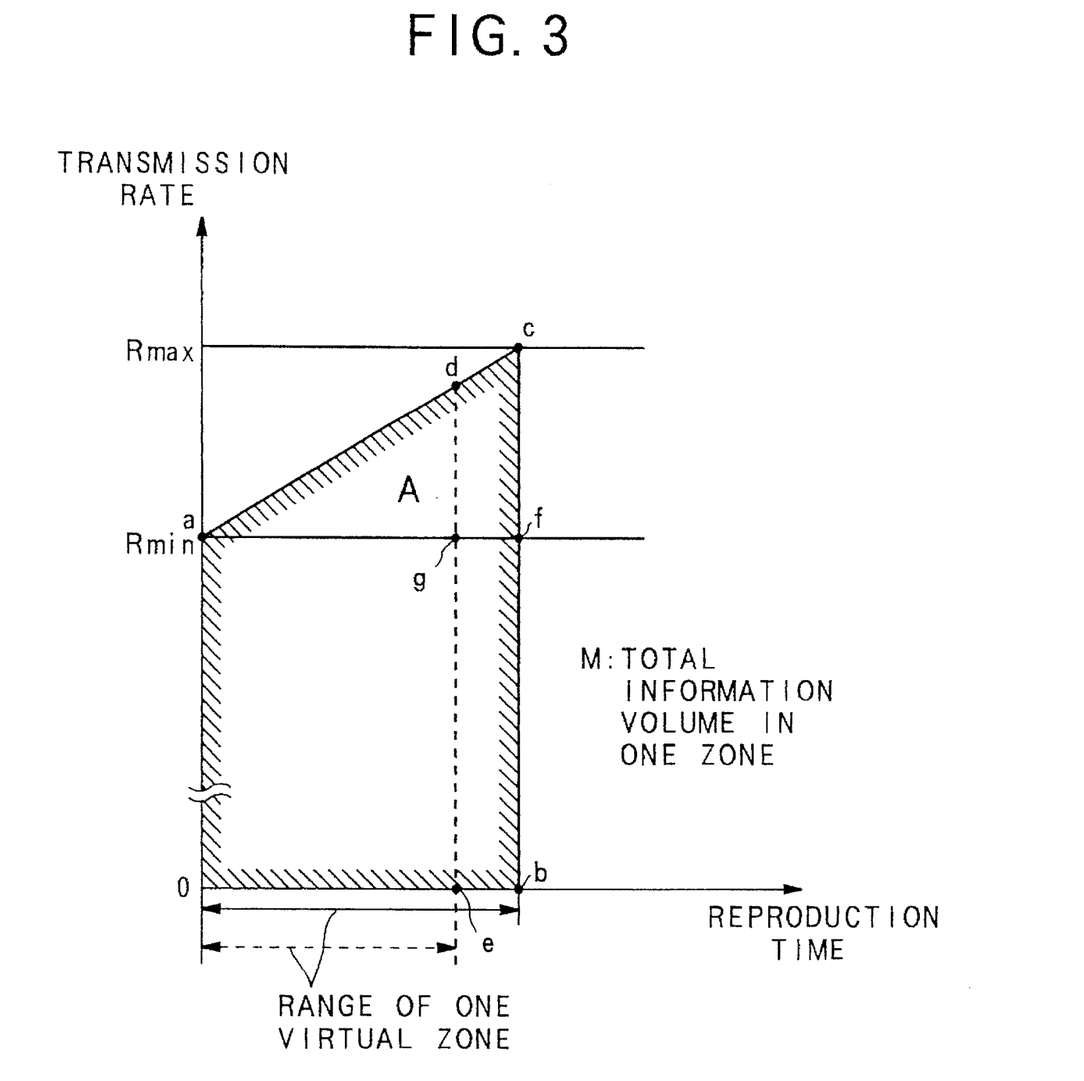
FIG. 3 is a graph showing a virtual zone set in the first embodiment.

Here, the concrete operations at the above mentioned step S3 are explained with referring to FIG. 3.

At the step S3, firstly, the number of rotation of the CLV disc 1 for the virtual zone which includes the most inner circumference of the program area i.e. the number of rotation for the zone 1 is determined on the basis of the radius of the most inner circumference of the program area on the CLV disc 1 and the lower limit value Rmin of the transmission rate. The lower limit value Rmin of the transmission rate is set to be a value equal to the maximum processing rate of processing the transmitted data prescribed by the processing capability of the host computer 102 (hereinbelow, it is simply referred to as a "processing capability of the host computer").

More concretely, supposing that the radius of the most inner circumference of the program area on the CLV disc 1 is r, and that the linear velocity of the rotation of the CLV disc 1 corresponding to the lower limit value Rmin of the transmission rate is v, the rotation angular velocity ω as well as the number of rotation RPM can obtained by use of the following expression (1).

$v = r \times \omega \ldots (1)$

For example, if Rmin=700 kBytes/sec and r=25 mm, the RPM is calculated as RPM=1870 r.p.m.

Once the number of rotation RPM is determined in this manner, the changing rate of the transmission rate at the number of rotation (which is equal to the slope of a line ac in FIG. 3) can be univocally determined.

Namely, during the reproduction of the zone 1 of the CLV disc 1, the transmission rate changes in accordance with the line ac of FIG. 3 from the lower limit value Rmin, while the information is stored and accumulated in the RAM for buffering 11 in accordance with this transmission rate, and at the same time, the information is outputted from the RAM for buffering 11 by the output rate Rmin, which corresponds to the maximum value of the processing capability of the host computer 102.

Once the number of rotation and the changing rate in the transmission rate are determined, the point c corresponding to the upper limit value Rmax of the transmission rate, which has been set in advance, in case that the transmission rate is changed by the determined changing rate. This upper limit value Rmax may be, for example, a maximum value prescribed by the processing capability for reading the information into the RAM for buffering 11 in the CD player 101. This maximum value is usually larger than the maximum value prescribed by the processing capability of the host computer 102. However, the upper limit value Rmax is not limited to this maximum value, but may be a voluntary value as long as it is not larger than the processing capability for reading the information into the RAM for buffer 11.

Once the point c of FIG. 3 is determined, by determining the point b on the reproduction time axis corresponding to this point c can be determined from the graph or a calculation, the radial range of the zone having the ring shape on the CLV disc 1 corresponding to the reproduction time Ob is determined as the radial range of the virtual zone (i.e. zone 1). Namely, the information volume M corresponding to the zone 1 corresponds to the area of the trapezoid aObc indicated as the shaded area in FIG. 3, and this information volume M is constant within each virtual zone in the present embodiment.

Here, the information volume accumulated in the RAM for buffering 11 is equal to the information volume A indicated as the area of the triangle acf in FIG. 3. If this information volume A is smaller than the memory capacity of the RAM for buffer 11 (which has been already checked at the step S1), the above mentioned method of determining the radial range of the virtual zone is sufficient. However, if the information volume A is larger than the memory capacity of the RAM for buffering 11, the radial zone in the ring shape on the CLV disc 1 corresponding to the reproduction time Oe is set as the radial range of the virtual zone by determining the point e on the reproduction time axis corresponding to the memory capacity of the RAM for buffering 11 (which corresponds to the area of triangle agd in FIG. 3).

As described above, once the information volume M corresponding to the virtual zone located at the most inner circumference of the program area of the CLV disc 1 is determined, the radial ranges of the other virtual zones are determined one after another so that the same information volume M is included in each virtual zone. Then, the number of rotation in each virtual zone can be determined by the method same as the above explained method by use of the expression (1) on the basis of the radial position on the CLV disc 1 corresponding to the most inner circumference of the radial range of each virtual zone and the lower limit value Rmin of the transmission rate. The number of rotation in each of the other virtual zones (i.e. zones 2 and 3) is not larger than that of the virtual zone located at the most inner circumference of the CLV disc 1 (i.e. zone 1), and the transmission rate within each of the other virtual zones (i.e. zones 2 and 3) does not exceeds the upper limit value Rmax.

Once the radial range of each virtual zone and the information volume included in each virtual zone are determined, the total number of the virtual zones for the reproduction of the CLV disc 1 is determined on the basis of those radial range and information volume determined by the step S3, and the total volume of the information recorded on the CLV disc 1 which has been already checked at the step S2.

By the above described operations, at the step S3, the radial range of each virtual zone, the number of rotation of the CLV disc 1 for each virtual zone and the total number of virtual zones can be determined.

Figure 4:
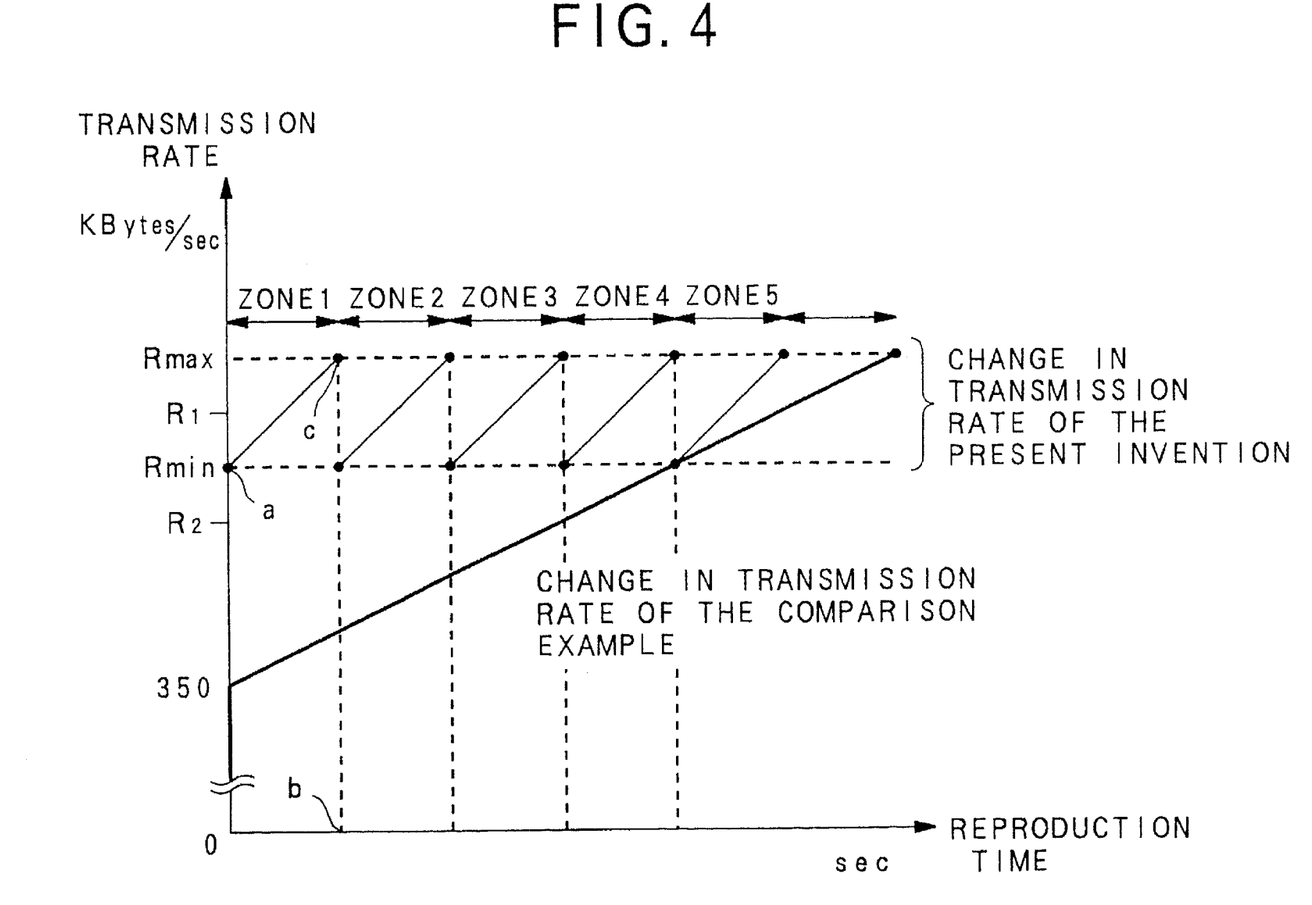
FIG. 4 is a graph showing a change in the transmission rate of reproduction in the first embodiment as compared with that of a comparison example.

FIG. 4 shows the relationship between the reproduction time and the transmission rate in a case where the CAV type information reproduction is performed according to the first embodiment. As a comparison example, the relationship between the reproduction time and the transmission rate in a case where the CLV disc is reproduced by the CLV type information reproduction is also shown in FIG. 4.

As shown in FIG. 4, the trapezoid aObc of FIG. 3 are repeated along the reproduction time axis to be arranged in parallel by the total number of the virtual zones. The repeated lines ac of the first embodiment are above the line of the comparison example. Accordingly, the average transmission rate R1 of the present embodiment as for the whole CLV disc 1 is much higher than the average transmission rate R2 of the comparison example, as clearly understood by FIG. 4.

Further, according to the first embodiment, the transmission rate itself is always higher than the output rate Rmin set on the basis of the processing capability of the host computer 102.

In a strict sense, the time to read out all of the information accumulated in the RAM for buffering 11 (i.e. the time to perform the steps S11, S16 and S21 in FIG. 2) is required at the time of switching the virtual zones. However, this required time is very short and negligible in a practical sense.

According to the first embodiment, since the transmission rate of the information can be kept to be always higher than the output rate (Rmin) set on the basis of the processing capability of the host computer. Thus, as a whole of the CLV disc 1, the average transmission rate can be improved, and that it is possible to make the best use of the processing capability of the CD player 101, so as to improve the processing efficiency.

(II) Second Embodiment.

The construction of the CD-ROM player of a second embodiment is the same as that in the first embodiment of FIG. 1. The operation of the second embodiment which is different from that of the first embodiment will be explained with referring to FIG. 5.

The radial range of each virtual zone and the number of rotation of the first embodiment are constant regardless of the total information volume recorded on the CLV 1, once the memory capacity of the RAM for buffering 11, the lower limit value Rmin of the transmission rate and the radius r of the most inner circumference of the program area of the CLV disc 1 are determined. The radius r of the most inner circumference of the program area of the CLV disc 1 is standardized to be a constant value (e.g. 25 mm) for all CLV discs 1 in the first embodiment. On the contrary to this, the second embodiment is constructed such that the memory capacity of the RAM for buffering 11, the lower limit value Rmin of the transmission rate and the radius of the most inner circumference of the program area are fixed to be constant, and that the radial range of each virtual zone and the number of rotation of each virtual zone are set and stored in the ROM 15 in advance. Only the total number of the virtual zones is determined in correspondence with the total information volume on the CLV disc 1 upon reproducing the CLV disc 1.

Figure 5:
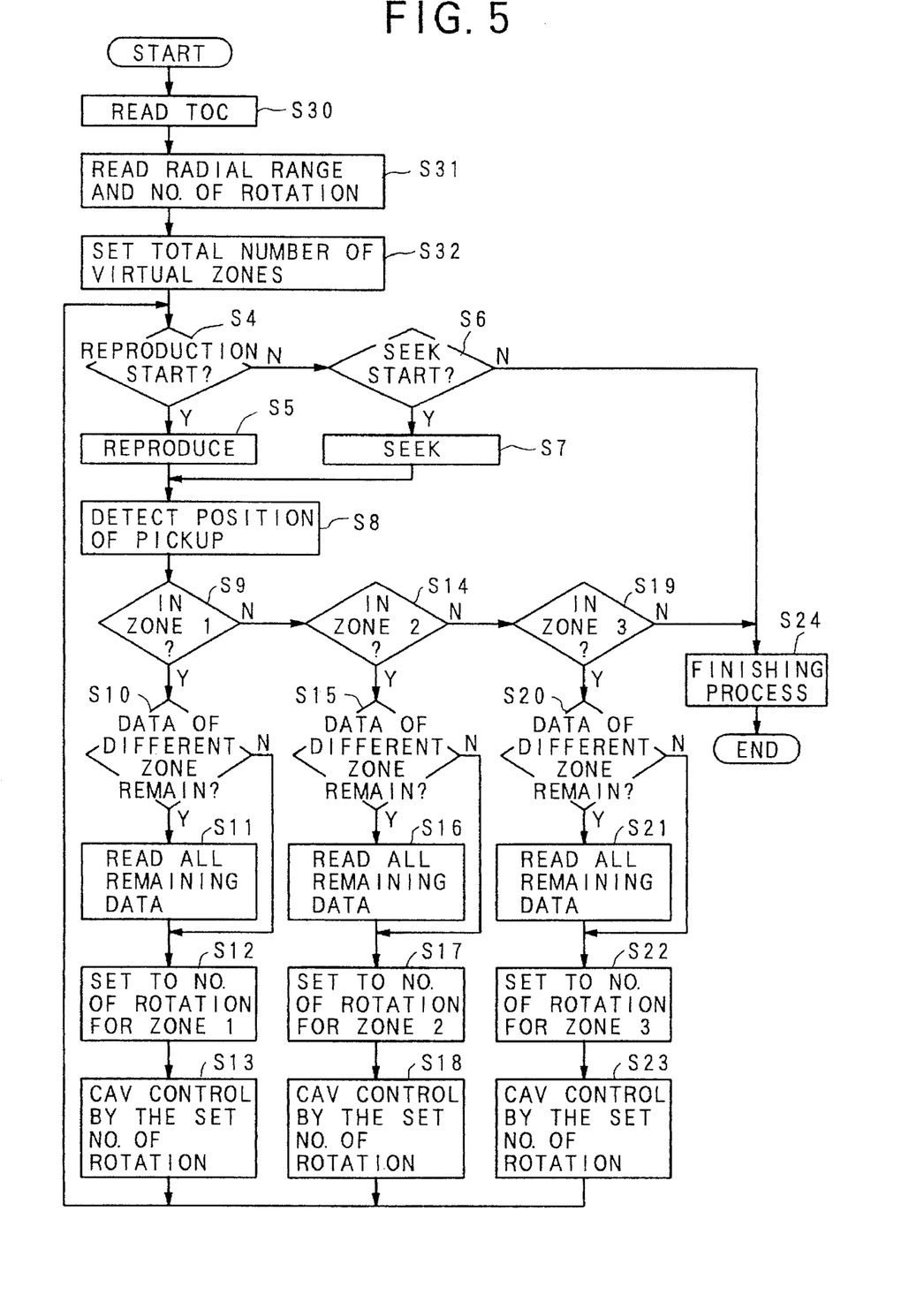
FIG. 5 is a flow chart showing an operation of a second embodiment of the present invention.

FIG. 5 shows an operation of the second embodiment.

In FIG. 5, firstly, the TOC information of the CLV disc 1 is read, and the total volume of the information recorded on the CLV disc 1 is checked (step S30).

Nextly, the radial range of each virtual zone and the number of rotation for each virtual zone are read from the ROM 15 (step S31). Then, on the basis of those read values as well as the total volume of the information recorded on the CLV disc 1 which has been already checked at the step S30, the total number of the virtual zones for reproducing the CLV disc 1 is set (step S32).

The processes after the step S32 i.e. the steps S4 to S24 are the same as the those in the first embodiment of FIG. 2, and the explanations thereof are omitted.

According to the second embodiment, in addition to the advantageous effect of the first embodiment, since the radial range of each virtual zone on the CLV disc 1 and the number of rotation for each virtual zone are set and stored to the ROM 15 in advance, the whole construction of the CD-ROM player 101 can be made simplified.

(III) Third Embodiment

The construction of a CD-ROM player of the third embodiment is the same as that of the first embodiment of FIG. 1. The operation of the third embodiment, which is different from that of the first or second embodiment, will be explained with referring to FIG. 6.

In the first and second embodiments, the radial range of each virtual zones and the number of rotation for each virtual zone are determined in advance, and the CAV type reproduction is performed on the basis of those values determined in advance. On the contrary to this, the third embodiment is constructed such that, without setting the virtual zones in advance, the information volume accumulated in the RAM for buffering 11 and the transmission rate are monitored during the CAV reproduction in a real time manner. Then, if the information volume accumulated in the RAM for buffering 11 exceeds a predetermined value (e.g. 80% of the memory capacity of the RAM for buffering 11, in FIG. 6), or if the transmission rate exceeds the upper limit value (e.g. Rmax in FIGS. 3 and 4), the number of rotation is updated on the basis of the information reading position on the CLV disc 1 and the lower limit value of the transmission rate (Rmin in FIGS. 3 and 4).

Here, as the upper limit value Rmax of the transmission rate, a voluntary value can be set as long as it is not higher than the maximum processing rate of reading into the RAM for buffering 11.

Figure 6:
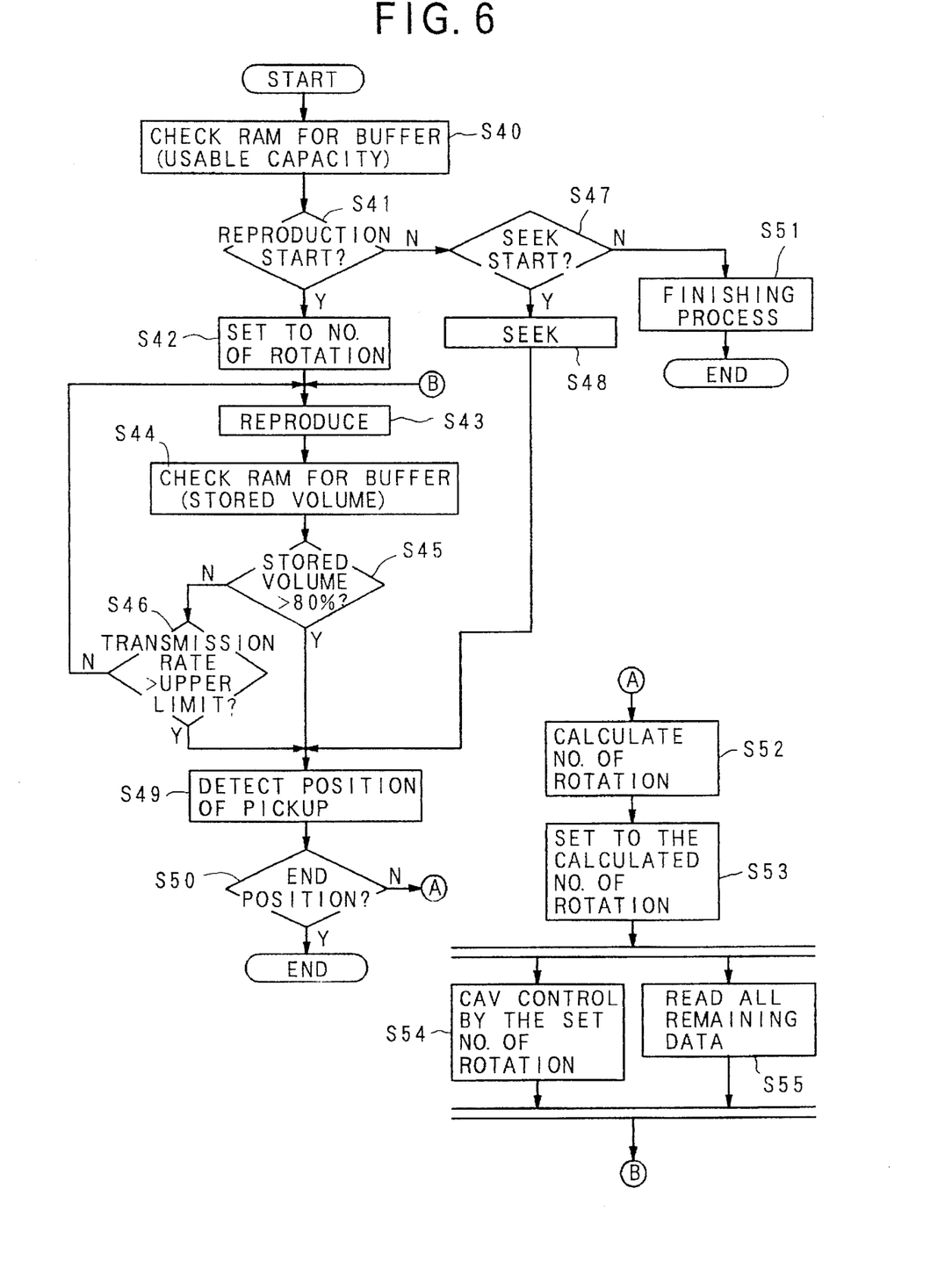
FIG. 6 is a flow chart showing an operation of a third embodiment of the present invention.

In FIG. 6, firstly, the memory capacity usable as a buffer in the RAM for buffering 11 is checked (step S40).

Nextly, it is judged whether or not the reproduction is to be started (step S41). If it is to be started (step S41, YES), the number of rotation RPM of the CLV disc 1 is set (step S42).

In the process at the step S42, the number of rotation RPM is determined and set in the same manner as the first embodiment by use of the expression (1), on the basis of the radius of the information reading position on the CLV disc 1 where the reproduction is to be started, and the lower limit value Rmin of the transmission rate set in advance by an instruction given from the external.

Here, in the third embodiment, the information reading position, where the reproduction is to be started, is fixed to be the position at the most inner circumference of the program area on the CLV disc 1 (i.e. the position at the radius 25 mm on the CLV disc 1) in the initial condition. If the reproduction is to be started at a position other than the most inner circumference of the CLV disc 1, one step of detecting the information reading position, where the reproduction is to be started, on the basis of the position of the optical pickup 3 is preferably added.

On the other hand, in case that the lower limit value Rmin of the transmission rate is not made variable, and that the reproduction is to be started at the most inner circumference of the program area, since the number of rotation is constant regardless of the kind of CLV disc 1, it is preferable to store this number of rotation to the RAM 15 and read it out at the step S42.

At the step S41, if the reproduction is not to be started (step S41, NO), it is judged whether or not the seek operation is to be started (step S47). If the seek operation is to be started (step S47, YES), the predetermined seek operation is started (step S48). If the seek operation is not to be performed (step S47, NO), the finishing process such as the fixing operation of the optical pickup 3 is performed (step S51).

Once the number of rotation RPM is set (step S42), the reproducing operation is started (step S43). In the reproducing operation, the CLV disc 1 is rotated by the constant number of rotation which has been set in the step S42, the information is read into the RAM for buffering 11 by the transmission rate corresponding to this number of rotation, and, at the same time, the information is read out by the output rate set on the basis of the processing capability of the host computer 102 (which corresponds to the lower limit value Rmin of the transmission rate). Then, the read out information is outputted through the interface portion 14 to the host computer 102.

Nextly, at the step S44, the information volume stored (accumulated) in the RAM for buffering 11 is detected on the basis of the usable memory capacity which has been already checked at the step S40. Then, it is judged whether or not the stored information volume exceeds 80% of the usable memory capacity (step S45). If it is not more than 80% (step S45, NO), it is further judged whether or not the transmission rate at the present time exceeds the upper limit value Rmax (step S46). If the transmission rate does not exceed the upper limit value Rmax (step S46, NO), the flow returns to the step S43 so as to continue the reproduction as it is.

At the step S45, the predetermined volume is set to 80%. However, it is not limited to 80%, but it may be a voluntary value, such as 90%, 100%, etc., as an appropriate value of the stored information volume of the RAM for buffering 11 at the time of switching the number of rotation of the CLV disc 1.

If the information volume stored in the RAM for buffering 11 exceeds 80% of the usable memory capacity (step S45, YES), or if the transmission rate at the present time exceeds the upper limit value Rmax (step S46, YES), the position of the optical pickup 3 i.e. the information reading position is detected by the optical pickup position sensor 5 so as to update (re-set) the number of rotation of the CLV disc 1 (step S49). Then, it is judged whether or not the detected position is the end position (i.e. the position within the lead out area of the CLV disc 1) (step S50). If it is the end position (step S50, YES), the reproduction process is ended. If it is not the end position (step S50, NO), this detected position is treated as the reproduction starting point for the next number of rotation. Then, a new number of rotation is calculated and set in the same manner as that of the first or second embodiment by use of the expression (1) on the basis of the radius of the CLV disc 1 corresponding to this detected position at the present time and the lower limit value Rmin of the transmission rate (step S52). The actual number of rotation of the spindle motor 6 is set to the calculated new number of rotation (step S53). Then, the new number of rotation is maintained to perform for the CAV type control (step S54) while the remaining data in the RAM for buffering 11 are read out (step S55). After all remaining data in the RAM for buffering 11 are read out, the flow returns to the step S43 so as to reproduce the information by use of the new number of rotation (namely, the CAV type reproduction is performed by the new number of rotation).

The relationship between the reproduction time and the transmission rate at the time of reproducing the information by the operation of the third embodiment is the same as that of the first embodiment shown in FIG. 4. Here, in FIG. 4, the information reading position at each point (time), where the transmission rate is discontinuous, is treated as the new reproduction starting position, and the new number of rotation is set at that time.

According to the above described third embodiment, since the transmission rate of data can be always set to be a value not less than the output rate set on the basis of the processing capability of the host computer 102, the average transmission rate can be improved as a whole of the CLV disc 1, and it is possible to make the best use of the processing capability of the CD player 101, to improve the processing efficiency.

As described above in detail, according to the present embodiments, the CAV type reproducing operation can be performed with respect to the CLV disc 1, in each of the virtual zones 1 to 3. During this reproducing operation, the transmission rate can be always made higher than the predetermined output rate by making the efficient use of the reading and outputting capability of the digital signal process portion 12 and the memory capacity of the RAM for buffering 11 in view of the predetermined output rate, which is prescribed by the capability of processing the information in the host computer 102. Consequently, the average transmission rate as for the whole information on the CLV disc 1 can be efficiently improved and the processing capability of the signal process unit 101 can be efficiently used. In this manner, since the CAV type reproduction is performed in each of the virtual zones, the access time can be made short according to the present embodiments. Especially, by setting the lower limit value Rmin of the transmission rate to be equal to the maximum process rate for processing the outputted information of the host computer 102, it is possible to make the best use of the processing capability of the host computer 102.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate, said method comprising the steps of:

setting radial ranges of a plurality of virtual zones on the record medium, each of which is in a ring shape and in each of which the information is to be read while rotating the record medium by a constant angular velocity, and the number of rotation for each of the virtual zones, on the basis of upper and lower limit values of the transmission rate, which are predetermined to be higher than the predetermined output rate, a radius of the most inner circumference of an area where the information is recorded on the record medium, and a memory capacity of the buffer memory;

rotating the record medium by the constant angular velocity in each of the set virtual zones by the set number of rotation corresponding to said each of the set virtual zones; and reading the information from the rotated record medium by the transmission rate corresponding to the set number of rotation in said each of the set virtual zones.

2. A method according to claim 1 further comprising the steps of:

detecting an information reading position on the record medium where the information is read; and identifying one of the set virtual zones which includes the detected information reading position, wherein, in the rotating and reading steps, the information in the identified virtual zone is read while the record medium is rotated by the set number of rotation corresponding to the identified virtual zone.

3. A method according to claim 2 further comprising the steps of:

judging whether or not there remains any information of a virtual zone other than said identified virtual zone in the buffer memory; and outputting the remaining information in the buffer memory to the external apparatus before reading the information of said identified virtual zone into the buffer memory.

4. A method according to claim 1 further comprising the step of detecting the memory capacity of the buffer memory before the setting step, wherein, in the setting step, the radial ranges and the number of rotation are set on the basis of the upper and lower limit values, the radius and the memory capacity detected by the detecting step.

5. A method according to claim 1 further comprising the step of detecting a total information volume of the information recorded on the record medium before the setting step, wherein, in the setting step, the radial ranges and the number of rotation as well as a total number of the virtual zones are set on the basis of the upper and lower limit values, the radius, the memory capacity and the total information volume detected by the detecting step.

6. A method according to claim 1, wherein the setting step comprises the steps of:

setting the number of rotation for one virtual zone which includes the most inner circumference on the basis of the radius and the lower limit value of the transmission rate;

calculating a changing rate of the transmission rate in said one virtual zone on the basis of the set number of rotation;

setting the radial range of said one virtual zone on the basis of the calculated changing rate and the upper limit value of the transmission rate;

determining an information volume of said one virtual zone on the basis of the set radial range of said one virtual zone; and repeating the number of rotation setting step, the changing rate calculating step, the radial range determining step and the information volume determining step for another virtual zone which is adjacent to said one virtual zone at an outer circumference side of said one virtual zone, one after another.

7. A method according to claim 1, wherein the lower limit value of the transmission rate is set to be equal to a maximum process rate for processing the outputted information of the external apparatus.

8. A method according to claim 1, wherein the lower limit value of the transmission rate is set to be equal to the predetermined output rate.

9. A method according to claim 1, wherein the upper limit value of the transmission rate is set to be not higher than a maximum reading rate for reading the information into the buffer memory.

10. A method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate, wherein radial ranges of a plurality of virtual zones on the record medium, each of which is in a ring shape and in each of which the information is to be read while rotating the record medium by a constant angular velocity, and the number of rotation for each of the virtual zones, are set on the basis of upper and lower limit values of the transmission rate, which are predetermined to be higher than the predetermined output rate, a radius of the most inner circumference of an area where the information is recorded on the record medium, and a memory capacity of the buffer memory, and the set radial ranges and the set number of rotation are stored in a memory device of the reproducing apparatus in advance of reproducing the information, said method comprising the steps of:

reading out the set radial ranges and the set number of rotation from the memory device;

rotating the record medium by the constant angular velocity in each of the virtual zones by the read out number of rotation corresponding to said each of the virtual zones; and reading the information from the rotated record medium by the transmission rate corresponding to the read out number of rotation in said each of the virtual zones.

11. A method according to claim 10 further comprising the steps of:

detecting an information reading position on the record medium where the information is read; and identifying one of the virtual zones which includes the detected information reading position, wherein, in the rotating and reading steps, the information in the identified virtual zone is read while the record medium is rotated by the read out number of rotation corresponding to the identified virtual zone.

12. A method according to claim 10 further comprising the steps of:

detecting a total information volume of the information recorded on the record medium; and setting a total number of the virtual zones on the basis of the upper and lower limit values, the radius, the memory capacity, and the total information volume detected by the detecting step.

13. A method according to claim 12 wherein, in the detecting step, a TOC (Table Of Contents) information, which includes information indicating the total information volume, is read from the record medium to detect the total information volume.

14. A method of reproducing information from a record medium of disc type, which is recorded by a constant linear velocity, by a reproducing apparatus, which rotates the record medium, reads the information from the rotated record medium into a buffer memory by a transmission rate corresponding to the number of rotation of the record medium and outputs the read information from the buffer memory to an external apparatus by a predetermined output rate, said method comprising the steps of:

setting the number of rotation of the record medium, on the basis of a lower limit value of the transmission rate, which is predetermined to be higher than the predetermined output rate, and a reproduction starting position on the record medium where the information is started to be reproduced;

rotating the record medium by a constant angular velocity by the set number of rotation;

reading the information from the rotated record medium by the transmission rate corresponding to the set number of rotation;

monitoring the transmission rate and the information volume accumulated in the buffer memory;

judging whether or not the monitored transmission rate exceeds a predetermined upper limit value of the transmission rate;

judging whether or not the monitored information volume exceeds a predetermined volume prescribed by a memory capacity of the buffer memory;

detecting an information reading position on the record medium where the information is read when at least one of the monitored transmission rate and the monitored information volume is judged to exceed in the judging steps; and outputting all information accumulated in the buffer memory to the external apparatus and updating the set number of rotation by performing the setting step again by use of the detected information reading position as the reproduction starting position of the setting step, after the step of detecting the information reading position, wherein, the record medium is rotated by the updated number of rotation from the detected information reading position.

15. A method according to claim 14 further comprising the step of detecting the memory capacity of the buffer memory, wherein the predetermined volume is determined on the basis of the detected memory capacity.

16. An apparatus for reproducing information from a record medium of disc type, which is recorded by a constant linear velocity, comprising:

a rotation means for rotating the record medium;

a read means including a buffer memory for reading the information from the rotated record medium into the buffer memory by a transmission rate corresponding to the number of rotation of the record medium;

an output means for outputting the read information from the buffer memory to an external apparatus by a predetermined output rate; and a setting means for setting radial ranges of a plurality of virtual zones on the record medium, each of which is in a ring shape and in each of which the information is to be read while rotating the record medium by a constant angular velocity, and the number of rotation for each of the virtual zones, on the basis of upper and lower limit values of the transmission rate, which are predetermined to be higher than the predetermined output rate, a radius of the most inner circumference of an area where the information is recorded on the record medium, and a memory capacity of the buffer memory, said rotation means rotating the record medium by the constant angular velocity in each of the set virtual zones by the set number of rotation corresponding to said each of the set virtual zones, said read means reading the information from the rotated record medium by the transmission rate corresponding to the set number of rotation in said each of the set virtual zones.

17. An apparatus according to claim 16 further comprising:

a position detection means for detecting an information reading position on the record medium where the information is read; and an identifying means for identifying one of the set virtual zones which includes the detected information reading position, wherein the information in the identified virtual zone is read by the read means while the record medium is rotated by the rotation means by the set number of rotation corresponding to the identified virtual zone.

18. An apparatus according to claim 17 further comprising a judgement means for judging whether or not there remains any information of a virtual zone other than said identified virtual zone in the buffer memory, said output means outputting the remaining information in the buffer memory to the external apparatus before said read means reads the information of said identified virtual zone.

19. An apparatus according to claim 16 further comprising a capacity detection means for detecting the memory capacity of the buffer memory, wherein the radial ranges and the number of rotation are set by said setting means on the basis of the upper and lower limit values, the radius and the memory capacity detected by the capacity detection means.

20. An apparatus according to claim 16, wherein said setting means comprises:

a first means for setting the number of rotation for one virtual zone which includes the most inner circumference on the basis of the radius and the lower limit value of the transmission rate;

a second means for calculating a changing rate of the transmission rate in said one virtual zone on the basis of the number of rotation set by said first means;

a third means for setting the radial range of said one virtual zone on the basis of the changing rate calculated by said second means and the upper limit value of the transmission rate;

a fourth means for determining an information volume of said one virtual zone on the basis of the radial range of said one virtual zone set by said third means; and a fifth means for controlling said first, second, third and fourth means to repeat each operation for another virtual zone which is adjacent to said one virtual zone at an outer circumference side of said one virtual zone, one after another.

21. An apparatus according to claim 16, wherein said read means comprises an information process unit for processing the information from the rotated record medium by a processing rate higher than the upper limit value of the transmission rate, and inputting the processed information into said buffer memory.

22. An apparatus for reproducing information from a record medium of disc type, which is recorded by a constant linear velocity, comprising:

a rotation means for rotating the record medium;

an information read means including a buffer memory for reading the information from the rotated record medium into a buffer memory by a transmission rate corresponding to the number of rotation of the record medium;

an output means for outputting the read information from the buffer memory to an external apparatus by a predetermined output rate;

a memory device for storing radial ranges of a plurality of virtual zones on the record medium, each of which is in a ring shape and in each of which the information is to be read while rotating the record medium by a constant angular velocity, and the number of rotation for each of the virtual zones, which are set on the basis of upper and lower limit values of the transmission rate, which are predetermined to be higher than the predetermined output rate, a radius of the most inner circumference of an area where the information is recorded on the record medium, and a memory capacity of the buffer memory; and a set value read means for reading out the set radial ranges and the set number of rotation from the memory device, said rotation means rotating the record medium by the constant angular velocity in each of the virtual zones by the read out number of rotation corresponding to said each of the virtual zones, said information read means reading the information from the rotated record medium by the transmission rate corresponding to the read out number of rotation in said each of the virtual zones.

23. An apparatus according to claim 22 further comprising:

a position detection means for detecting an information reading position on the record medium where the information is read; and an identify means for identifying one of the virtual zones which includes the detected information reading position, wherein the information in the identified virtual zone is read by said information read means while the record medium is rotated by the rotation means by the read out number of rotation corresponding to the identified virtual zone.

24. An apparatus for reproducing information from a record medium of disc type, which is recorded by a constant linear velocity, comprising:

a rotation means for rotating the record medium;

a read means including a buffer memory for reading the information from the rotated record medium into the buffer memory by a transmission rate corresponding to the number of rotation of the record medium;

an output means for outputting the read information from the buffer memory to an external apparatus by a predetermined output rate;

a setting means for setting the number of rotation of the record medium, on the basis of a lower limit value of the transmission rate, which is predetermined to be higher than the predetermined output rate, and a reproduction starting position on the record medium where the information is started to be reproduced, said rotation means rotating the record medium by a constant angular velocity by the set number of rotation, said read means reading the information from the rotated record medium by the transmission rate corresponding to the set number of rotation;

a monitor means for monitoring the transmission rate and the information volume accumulated in the buffer memory;

a first judgement means for judging whether or not the monitored transmission rate exceeds a predetermined upper limit value of the transmission rate;

a second judgement means for judging whether or not the monitored information volume exceeds a predetermined volume prescribed by a memory capacity of the buffer memory;

a position detection means for detecting an information reading position on the record medium where the information is read when at least one of the monitored transmission rate and the monitored information volume is judged to exceed by said first and second judgement means, said output means outputting all information accumulated in the buffer memory to the external apparatus; and an update means for updating the set number of rotation by controlling said setting means to set the number of rotation again by use of the detected information reading position as the reproduction starting position in said setting means, after the information reading position is detected by said position detection means, wherein, the record medium is rotated by the updated number of rotation from the detected information reading position.

25. An apparatus according to claim 24 further comprising a capacity detection means for detecting the memory capacity of the buffer memory, wherein the predetermined volume is determined on the basis of the detected memory capacity.

26. An apparatus according to claim 24, wherein the predetermined upper limit value of the transmission rate is set to be not higher than a maximum reading rate for reading the information into the buffer memory in said read means.

* * * * *